(12) United States Patent
Parish et al.

(10) Patent No.: US 6,402,060 B1
(45) Date of Patent: Jun. 11, 2002

(54) INJECTOR VALVE SEAT AND NEEDLE

(75) Inventors: James Robert Parish, Yorktown; James Fochtman, Williamsburg, both of VA (US)

(73) Assignee: Siemens Automotive Corporation, Auburn Hills, MI (US)

(*) Notice: Subject to any disclaimer, the term of this patent is extended or adjusted under 35 U.S.C. 154(b) by 0 days.

(21) Appl. No.: 09/557,620

(22) Filed: Apr. 25, 2000

(51) Int. Cl.[7] ............................................. F02M 41/00
(52) U.S. Cl. .................................. 239/533.3; 239/585.1
(58) Field of Search ........................ 239/533.12, 533.9, 239/533.8, 533.3, 585.5, 585.1

(56) References Cited

U.S. PATENT DOCUMENTS

| | | | |
|---|---|---|---|
| 4,413,780 A | * 11/1983 | Skinner et al. ..... 239/533.12 X |
| 4,621,772 A | 11/1986 | Blythe et al. ............... 239/585 |
| 4,967,959 A | 11/1990 | Wieczorek .................. 239/104 |
| RE33,841 E | 3/1992 | Rush et al. ................. 239/543 |
| 5,383,607 A | 1/1995 | Heyse et al. .............. 239/585.4 |
| 5,762,272 A | 6/1998 | Tani et al. ................... 239/543 |
| 5,772,124 A | 6/1998 | Tamaki et al. ......... 239/533.12 |
| 5,996,912 A | 12/1999 | Ren et al. ................ 239/585.5 |
| 6,027,050 A | 2/2000 | Rembold et al. ........ 239/585.5 |

* cited by examiner

*Primary Examiner*—Lesley D. Morris

(57) ABSTRACT

A valve seat and a needle for a fuel injector are disclosed. The fuel injector includes a longitudinal axis extending therethrough, the valve seat, and the needle. The valve seat includes a channel having a channel wall extending along the longitudinal axis and a needle contact area upstream from the channel. The needle contact area is proximate to the channel such that fuel deposits form exclusively on the channel wall and on the valve seat upstream of the needle contact area. The needle includes a generally tubular perimeter, a downstream end, and a generally circular recess in the downstream end. The generally circular recess has a center generally along the longitudinal axis and an outer recess perimeter. The outer recess perimeter is proximate to the generally tubular perimeter such that fuel deposits form exclusively in the generally circular recess. A method of forming fuel deposits on the injector is also disclosed.

13 Claims, 1 Drawing Sheet

INJECTOR VALVE SEAT AND NEEDLE

BACKGROUND OF INVENTION

Prior art fuel injector designs exhibited reduced fuel flow over use due to hydrocarbon deposits accumulating on the tip of the injector. Testing has shown that, prior to cleaning (0 to 150 million cycles), a general decreasing trend in fuel flow in twelve test injectors is exhibited as each injector accumulates additional cycles. At 75 million cycles and 150 million cycles, static flow tests were conducted to determine the fuel flow rate through the injectors. At 75 million cycles, flow rate decreased as much as 4.5% from baseline measurements. At 150 million cycles, flow rate decreased as much as 7.5% from baseline. Flow rates between 0 and 75 million cycles, and flow rates between 75 million and 150 million cycles were interpolated. At 150 million cycles, the fuel injectors were removed, cleaned, and reinstalled. Static flow tests were conducted on the cleaned injectors to determine fuel flow rate. Fuel flow through the cleaned injectors was restored to its original value.

It would be beneficial to develop a fuel injector in which deposits, which decrease fuel flow through the injector, are prevented from forming.

BRIEF SUMMARY OF THE PRESENT INVENTION

Briefly, the present invention provides a valve seat for a fuel injector. The valve seat comprises a longitudinal axis extending therethrough and a channel extending along the longitudinal axis. The channel has a channel wall. The valve seat also comprises a needle contact area upstream from the channel. The needle contact area is proximate to the channel such that fuel deposits form exclusively on the channel wall and on the valve seat upstream of the needle contact area.

Additionally, the present invention discloses a needle for a fuel injector. The needle comprises a generally tubular perimeter and a longitudinal axis extending therethrough. The needle also comprises a downstream end and a generally circular recess in the downstream end. The generally circular recess has a center generally along the longitudinal axis and an outer recess perimeter. The outer recess perimeter is proximate to the generally tubular perimeter such that fuel deposits form exclusively in the generally circular recess.

Additionally, the present invention discloses a fuel injector. The fuel injector comprises a longitudinal axis extending therethrough, a valve seat, and a needle. The valve seat comprises a channel extending along the longitudinal axis and a needle contact area upstream from the channel. The channel has a channel wall and the needle contact area is proximate to the channel such that fuel deposits form exclusively on the channel wall and on the valve seat upstream of the needle contact area. The needle comprises a generally tubular perimeter, a downstream end, and a generally circular recess in the downstream end. The generally circular recess has a center generally along the longitudinal axis and an outer recess perimeter. The outer recess perimeter is proximate to the generally tubular perimeter such that fuel deposits form exclusively in the generally circular recess.

Further, the present invention discloses a method of forming deposits on a valve seat of a fuel injector exclusively in a fuel channel and upstream from a needle contact area and on a needle of the fuel injector exclusively in a recess in a downstream end of the needle. The method comprises the steps of providing an injector including a longitudinal axis extending therethrough, a valve seat, and a needle. The valve seat comprises a channel extending along the longitudinal axis and a needle contact area upstream from the channel. The channel has a channel wall. The needle contact area is proximate to the channel such that fuel deposits form exclusively on the channel wall and on the valve seat upstream of the needle contact area. The needle includes a generally tubular perimeter; a downstream end, and a generally circular recess in the downstream end. The generally circular recess has a center generally along the longitudinal axis and an outer recess perimeter. The outer recess perimeter is proximate to the generally tubular perimeter such that fuel deposits form exclusively in the generally circular recess. The method also includes operating the fuel injector.

BRIEF DESCRIPTION OF THE DRAWINGS

The accompanying drawings, which are incorporated herein and constitute part of this specification, illustrate a presently preferred embodiment of the invention, and, together with the general description given above and the detailed description given below, serve to explain features of the invention. In the drawings.

DETAILED DESCRIPTION OF THE PREFERRED EMBODIMENT

Figure 1:
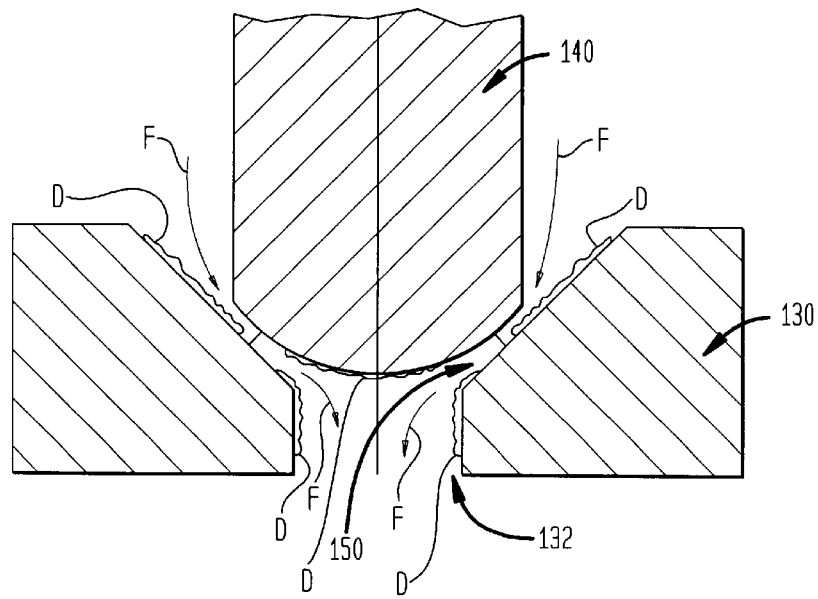
FIG. 1 is a side view, in section, of a prior art fuel injector.

Fuel injectors which have been operated over an extended period of time have exhibited decreased fuel flow characteristics which have been corrected by disassembling the fuel injectors and cleaning them. The applicants of the present invention believe that they have discovered that the decreased flow results from deposit build-up on the valve seat and needle tip, reducing the cross-sectional area between the valve seat and the needle tip. Prior to cleaning, the injectors were inspected to determine exactly where the deposits D formed on the injector. As shown in FIG. 1, the deposits "D" accumulated on the valve seat 130 and the tip of the needle 140, reducing the size of a flow channel 150 between the valve seat 130 and the needle 140 when the needle 140 is in an open position. As a result, fuel flow "F" through the flow channel 150 and into the valve seat channel 132 was reduced over time. By cleaning these areas in particular, applicants have discovered that fuel flow through the injector can be restored to its original value.

A fuel injector 10 to which the present invention can be applied is disclosed by U.S. Pat. No. 5,875,972, which is owned by the assignee of the present invention and is incorporated herein by reference.

Figure 2:
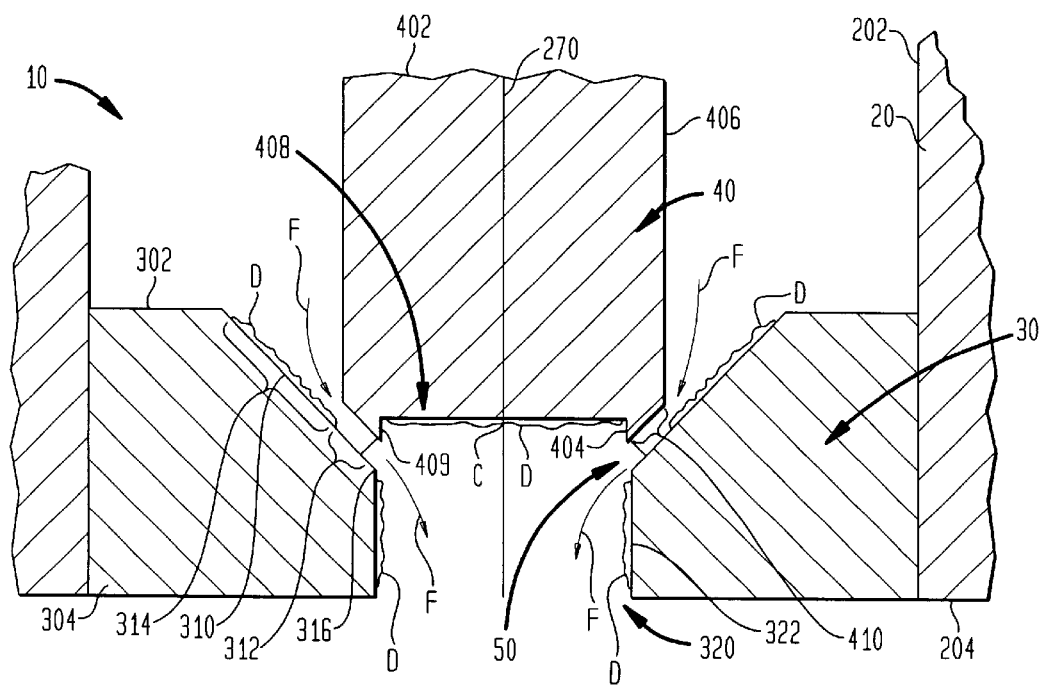
FIG. 2 is a side view, in section, of a fuel injector according to a preferred embodiment of the preferred invention.

In the drawings, like numerals are used to indicate like elements throughout. FIG. 2 shows a cross section of the fuel injector 10 having a housing 20, which incorporates a valve seat 30 and a needle 40 according to a preferred embodiment of the present invention. The housing has an upstream end 202 and a downstream end 204. As used herein, the term "upstream" is defined to mean in a direction toward the top of the figure referred, and "downstream" is defined to mean in a direction toward the bottom of the figure referred. The valve seat 30 and the needle 40 are disposed within the housing 20.

The valve seat 30 includes an upstream end 302 and a downstream end 304. The seat includes a generally beveled seating surface 310 that tapers downstream and toward a longitudinal axis 270 of the injector 10. The beveled seating surface 310 includes three general areas, a valve seating area 312, which includes an area of contact between the needle 40 and the valve seat 30; an upstream area 314, which is upstream of the valve seating area 312; and a downstream area 316, which is downstream of the valve seating area 312. Preferably, the downstream area 316 extends between approximately 0 and 500 microns downstream of the valve seating area 312 and more preferably, the downstream area 316 extends between approximately 0 and 300 microns downstream of the valve seating area 312. A fluid channel 320 is located through a center of the valve seat 30, generally along the longitudinal axis 270. The channel 320 includes a generally circular wall 322 which extends from the downstream area 316 farthest from the valve seating area 312 downstream to the downstream end 304 of the valve seat 30. Preferably, the wall 322 is generally parallel to the longitudinal axis 270, although those skilled in the art will recognize that the wall 322 need not be parallel to the longitudinal axis 270.

The needle 40 includes an upstream end 402 and a downstream end 404. The needle 40 also includes a generally tubular or circular outer perimeter 406. The outer perimeter 406 is preferably equidistant from the longitudinal axis 270 all around the perimeter 406. The downstream end 404 of the needle 40 includes a generally circular recess 408 which has a center "C" preferably on the longitudinal axis 270. The recess 408 includes a generally circular wall 409 which defines the recess 408 and is generally parallel to the longitudinal axis 270. However, those skilled in the art will recognize that the wall 409 need not be parallel to the longitudinal axis 270. Additionally, those skilled in the art will recognize that the wall 409 need not be circular, and that the recess 408 need not be flat, as shown in FIG. 2. The needle 40 also includes a needle seating area 410 on the downstream end 404 between the recess 408 and the perimeter 406.

When the needle 40 is in the open position, as shown in FIG. 2, a flow channel 50 is formed between the valve seating area 312 and the needle seating area 410. Pressurized fuel "F" flows from upstream to downstream, between the valve seat 30 and the needle 40 in the flow channel 50, and through the channel 320 in the valve seat 30 for injection. The size of the flow channel 50 depends on the lift of the needle 40 from the valve seat 30, which is set during the manufacturing process. The minimum size of the flow channel 50 determines the fuel flow rate through the injector 10. As can be seen in FIG. 2, the minimum size of the flow channel 50 when the needle 40 is in the fully open position is located proximate to the channel 320. After injection, the needle 40 moves downstream so that the needle seating area 410 engages the valve seating area 312, closing the injector 10 with respect to the valve seat 30, and shutting off fuel flow F to the channel 320.

After numerous operational cycles of the injector 10 (i.e. opening and closing the needle 40 with respect to the valve seat 30), deposits "D" in the fuel form on surfaces of the valve seat 30 and the needle 40. Specifically, the deposits D form on the upstream area 314 upstream of the valve seating area 312 and on the channel wall 322. The valve seating area 312 remains clear of deposits D because of the velocity of the fluid flow F through the injector 10 and also because of the contact with the needle 40. The deposits D also form in the recess 408 of the needle 40. The outer perimeter of the recess 408 is proximate to the generally tubular perimeter 406 such that fuel deposits D form exclusively in the recess 408. The deposits D do not form in the needle seating area 410 due to the relatively high velocity of the fluid flow F through the flow channel 50 at this location as well as because of contact with the valve seat 30.

Deposits D may try to form on the downstream area 316, but the fluid flow F remains relatively high in this area, and deposits D that may accumulate in this area break off very easily and are prevented from building up. The deposits D that do form in the upstream area 314, on the channel wall 322 and in the recess 408 do not reduce the minimum size of the flow channel 50, and therefore, do not reduce fuel flow F through the injector 10.

Preferably, the valve seat 30 and the needle 40 are constructed from stainless steel, although those skilled in the art will recognize that the valve seat 30 and the needle 40 can be constructed from other suitable materials instead. The channel 320 and the recess 408 are preferably formed by well-known methods, such as drilling, reaming, or electrical discharge machining, although those skilled in the art will recognize that the channel 320 and the recess 408 can be formed by other methods instead.

The injector 10 according to the preferred embodiment of the present invention maintains fuel flow values comparable to initial baseline flows. Preferably, compressed natural gas is used as the fuel for the injector 10, although those skilled in the art will recognize that other types of fuels can be used as well.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined in the appended claims.

What is claimed is:

1. A fuel injector comprising:
   a longitudinal axis extending therethrough;
   a valve seat including:
      a channel extending along the longitudinal axis, the channel having a channel wall; and
      a needle contact area upstream from the channel, the needle contact area
      being proximate to the channel; and
   a needle including:
      a generally tubular perimeter;
      a downstream end; and
      a generally circular recess in the downstream end, the generally circular
      recess having a center generally along the longitudinal axis and an outer
      recess perimeter, the outer recess perimeter being proximate to the
      generally tubular perimeter, wherein fuel deposits form exclusively on the
      channel wall and on the valve seat upstream of the needle contact area.

2. The fuel injector according to claim 1, wherein fuel used in the fuel injector is compressed natural gas.

3. The fuel injector according to claims 1, wherein the needle contact area being spaced from the channel wall by a distance between 0 and 500 microns.

4. The valve seat according to claim 3, wherein the distance is between 0 and 300 microns.

5. A valve seat for a fuel injector comprising:
   a longitudinal axis extending therethrough;
   a channel extending along the longitudinal axis, the channel having a channel wall; and a needle contact area upstream from the channel, the needle contact area being proximate to the channel such that fuel deposits form exclusively on the channel wall and on the valve seat upstream of the needle contact area.

6. The valve seat according to claim 5, wherein the channel wall is generally parallel to the longitudinal axis.

7. The valve seat according to claim 5, wherein the needle contact area and the channel are separated by less than three hundred microns.

8. The valve seat according to claim 5, wherein fuel used in the fuel injector is compressed natural gas.

9. The valve seat according to claim 5, wherein the channel wall extends between a downstream area proximate the needle contact area and a downstream end of the valve seat, the downstream area contiguous with the downstream end.

10. A needle for a fuel injector comprising:
   a generally tubular perimeter;
   a longitudinal axis extending therethrough;
   a downstream end;
   a generally circular recess in the downstream end, the generally circular recess having a center generally along the longitudinal axis and an outer recess perimeter, the outer recess perimeter being proximate to the generally tubular perimeter such that fuel deposits form exclusively in the generally circular recess; and
   a valve seat contact area connecting the generally tubular perimeter and the generally circular recess, wherein the circular recess includes a wall generally parallel to the longitudinal axis.

11. A method of maintaining a desired fuel flow geometry between a valve seat and a needle in a fuel injector in a fully open position, the method comprising:
   providing a fuel injector including:
      a longitudinal axis extending therethrough;
      a valve seat comprising:
         a channel extending along the longitudinal axis, the channel having a channel wall; and
         a needle contact area upstream from the channel, the needle contact area being proximate to the channel; and
      a needle including:
         a generally tubular perimeter;
         a downstream end; and
         a generally circular recess in the downstream end, the generally
         circular recess having a center generally along the longitudinal axis and an
         outer recess perimeter, the outer recess perimeter being proximate to the
         generally tubular perimeter; operating the fuel injector such that fuel flowing through the channel washes deposits away from the channel downstream of the needle/valve seat contact area; and
   forming deposits on a valve seat of a fuel injector exclusively in a fuel channel and upstream from a needle contact area.

12. A fuel injector comprising:
   a longitudinal axis extending therethrough;
   a valve seat including:
      a channel extending along the longitudinal axis, the channel having a channel wall; and
      a needle contact area upstream from the channel, the needle contact area being proximate to the channel; and
   a needle including:
      a generally tubular perimeter;
      a downstream end; and
      a generally circular recess in the downstream end, the generally circular recess having a center generally along the longitudinal axis and an outer recess perimeter, the outer recess perimeter being proximate to the generally tubular perimeter, wherein the channel wall extends between a downstream area proximate the needle contact area and a downstream end of the valve seat, the downstream area contiguous with the downstream end.

13. A method of maintaining a desired fuel flow geometry between a valve seat and a needle in a fuel injector in a fully open position, the method comprising:
   providing a fuel injector including:
      a longitudinal axis extending therethrough;
      a valve seat comprising:
         a channel extending along the longitudinal axis, the channel having a channel wall extending between a downstream area proximate the needle contact area and a downstream end of the valve seat, the downstream area contiguous with the downstream end;
         a needle contact area upstream from the channel, the needle contact area being proximate to the channel; and
      a needle including:
         a generally tubular perimeter;
         a downstream end; and
         a generally circular recess in the downstream end, the generally circular recess having a center generally along the longitudinal axis and an outer recess perimeter, the outer recess perimeter being proximate to the generally tubular perimeter; and
   operating the fuel injector such that fuel flowing through the channel washes deposits away from the channel downstream of the needle/valve seat contact area.

* * * * *